(12) United States Patent
Windeler et al.

(10) Patent No.: US 11,072,284 B2
(45) Date of Patent: Jul. 27, 2021

(54) VEHICULAR VISION SYSTEM USING WIRELESS CAMERA

(71) Applicant: Magna Electronics Inc., Auburn Hills, MI (US)

(72) Inventors: Joshua G. Windeler, Grand Blanc, MI (US); Krishna Koravadi, Rochester Hills, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 16/364,245

(22) Filed: Mar. 26, 2019

(65) Prior Publication Data

US 2019/0299862 A1 Oct. 3, 2019

Related U.S. Application Data

(60) Provisional application No. 62/649,116, filed on Mar. 28, 2018.

(51) Int. Cl.

| | | |
|---|---|---|
| *B60R 11/00* | (2006.01) | |
| *B60R 1/00* | (2006.01) | |
| *B60R 11/04* | (2006.01) | |
| *H04N 7/18* | (2006.01) | |
| *H04N 5/235* | (2006.01) | |
| *H04N 5/225* | (2006.01) | |

(52) U.S. Cl.
CPC .............. *B60R 1/003* (2013.01); *B60R 11/00* (2013.01); *B60R 11/04* (2013.01); *H04N 5/2256* (2013.01); *H04N 5/2354* (2013.01); *H04N 7/183* (2013.01); *B60R 2011/004* (2013.01); *B60R 2300/20* (2013.01); *B60R 2300/406* (2013.01); *B60R 2300/808* (2013.01); *B60R 2300/8066* (2013.01)

(58) Field of Classification Search
CPC ................................. H04N 7/181; B60R 11/00
USPC ............................................ 348/148; 725/105
See application file for complete search history.

(56) References Cited

U.S. PATENT DOCUMENTS

| | | | |
|---|---|---|---|
| 5,550,677 A | 8/1996 | Schofield et al. | |
| 5,670,935 A | 9/1997 | Schofield et al. | |
| 5,949,331 A | 9/1999 | Schofield et al. | |
| 7,131,136 B2* | 10/2006 | Monroe ............. | G08B 13/1966 725/105 |
| 7,937,667 B2* | 5/2011 | Kramer .................. | B60K 35/00 715/781 |

(Continued)

*Primary Examiner* — John W Miller
*Assistant Examiner* — Sihar A Karwan
(74) *Attorney, Agent, or Firm* — Honigman LLP

(57) ABSTRACT

A vehicular vision system includes a vehicle camera docking station disposed at a vehicle, a trailer camera docking station disposed at a rear of a trailer, and a camera operable to capture image data and to communicate captured image data to a data receiving device at the vehicle. When the trailer is not hitched to the vehicle, the camera is disposed at the vehicle camera docking station so as to have a field of view rearward of the vehicle. When the trailer is hitched to the vehicle, the camera is removed from the vehicle camera docking station and disposed at the trailer camera docking station so as to have a field of view rearward of the trailer. The camera captures image data and communicates captured image data to the data receiving device, which receives the communicated image data. A display device displays video images derived from the received image data.

22 Claims, 1 Drawing Sheet

(56) References Cited

U.S. PATENT DOCUMENTS

| | | | |
|---|---|---|---|
| 8,044,776 B2 * | 10/2011 | Schofield | B60C 23/0408 340/425.5 |
| 9,499,139 B2 | 11/2016 | Koravadi | |
| 9,674,490 B2 | 6/2017 | Koravadi | |
| 9,688,199 B2 | 6/2017 | Koravadi | |
| 9,729,636 B2 | 8/2017 | Koravadi et al. | |
| 9,881,220 B2 | 1/2018 | Koravadi | |
| 2017/0158133 A1 | 6/2017 | Chundrlik, Jr. et al. | |
| 2017/0254873 A1 | 9/2017 | Koravadi | |
| 2017/0334484 A1 | 11/2017 | Koravadi | |
| 2018/0082315 A1 | 3/2018 | Smid et al. | |
| 2018/0158337 A1 | 6/2018 | Koravadi | |
| 2019/0016264 A1 | 1/2019 | Potnis et al. | |
| 2019/0225152 A1 | 7/2019 | Koravadi | |
| 2019/0230323 A1 | 7/2019 | Koravadi et al. | |

* cited by examiner

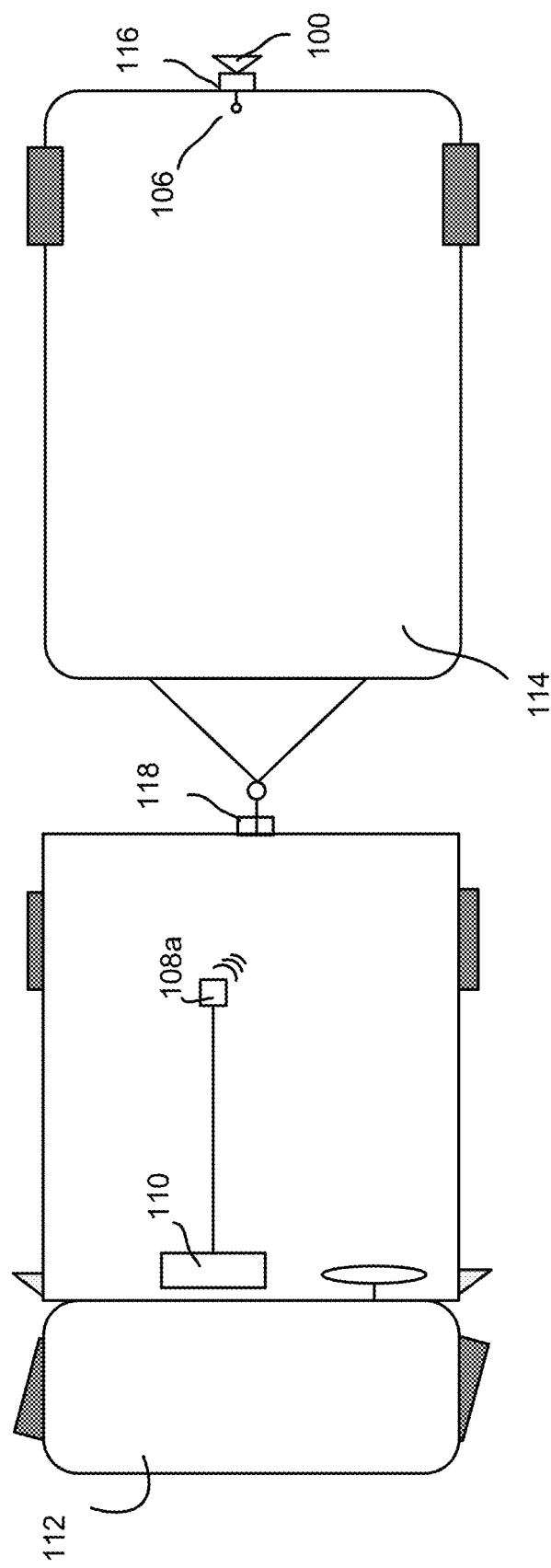

VEHICULAR VISION SYSTEM USING WIRELESS CAMERA

CROSS REFERENCE TO RELATED APPLICATION

The present application claims the filing benefits of U.S. provisional application Ser. No. 62/649,116, filed Mar. 28, 2018, which is hereby incorporated herein by reference in its entirety.

FIELD OF THE INVENTION

The present invention relates generally to a vehicle vision system for a vehicle and, more particularly, to a vehicle vision system that utilizes one or more wireless cameras at a trailer being towed by a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driver assistance system or vision system or imaging system for a vehicle that utilizes one or more cameras to capture image data representative of images exterior of the vehicle, and provides a method and apparatus to provide enhanced communication between a vehicle control or system and a wireless camera disposed at a rear of a trailer being towed by the vehicle. The system provides for mounting and demounting a camera at a docking station at the vehicle or at a docking station at a trailer, so that a single camera may be used for either trailer towing maneuvers (where the camera is mounted at a docking station at the trailer) or non-trailering maneuvers (where the camera is mounted at a docking station at the vehicle).

These and other objects, advantages, purposes and features of the present invention will become apparent upon review of the following specification in conjunction with the drawings.

BRIEF DESCRIPTION OF THE DRAWINGS

FIG. 1 is a top view of a vehicle towing a trailer, with a wireless camera installed at the rear of the trailer.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

A vision system for a vehicle 112 includes a controller or display 110 at the vehicle, with a receiving antenna 108a at the vehicle for receiving wireless signals transmitted by an antenna 106 of a wireless camera 100 disposed at the rear of a trailer 114. The wireless camera 100 at the rear of the trailer 114 may have its antenna mounted at a front surface of the trailer and may use a shielded antenna cable installed at the trailer to connect the camera to the antenna, such as by utilizing aspects of the systems described in U.S. patent application Ser. No. 16/250,503, filed Jan. 17, 2019, and Ser. No. 16/250,480, filed Jan. 17, 2019, which are hereby incorporated herein by reference in their entireties.

The vision system may incorporate wireless charging into a camera and docking station (such as a Qi charger). The system is configured so that a docking station may be permanently mounted at the trailer and at the vehicle, such that the camera may be moved from docking station to docking station. For example, when no trailer is being towed by the vehicle, the camera may be docked at the rear of the vehicle, and when a trailer is towed by the vehicle, the camera may be moved to a docking station at the rear of the trailer. Optionally, a wireless charger may be incorporated into the camera, and the docking station may be provided separately with a 12v/USB or other power source. The dock or docking station may be a standalone docking station or may be incorporated into the vehicle.

As shown in FIG. 1, the camera 100 may be mounted at a docking station 116 at the rear of the trailer 114 (when the vehicle is towing the trailer). When the vehicle is not towing a trailer, the camera 100 may be removed from the docking station 116 and mounted at a docking station 118 at the rear of the vehicle. The camera and docking stations may function in a plug-and-play manner, such that electrical connections are made when the camera is mounted at the selected or appropriate docking station, as discussed below.

The docking station at the vehicle may be a permanent part of the vehicle or integrated in the vehicle, so that the camera, when docked at the vehicle docking station, is integrated in the vehicle and is part of the vehicle vision system. Likewise, the docking station at the trailer may be a permanent part of the trailer or integrated in the trailer, so that the camera, when docked at the trailer docking station, is in communication with the vehicle vision system and is integrated in the vehicle vision system (such as via communication link between the trailer docking station and a receiver at the vehicle that becomes operational when the camera is disposed at the trailer docking station and/or responsive to a user input and/or responsive to the trailer docking station being within range of the vehicle receiver or the like). The camera thus may mount at either the trailer docking station or vehicle docking station, depending on whether the trailer is being towed by vehicle.

The camera, when docked at either the vehicle docking station or the trailer docking station, captures image data and the captured image data is communicated to a data receiver for processing and/or display of video images derived therefrom. For example, when the camera is docked at the trailer docking station, the camera may capture image data and the camera or trailer docking station may wirelessly transmit or communicate the captured image data to the data receiver at the vehicle. Optionally, the vehicle docking station may include the data receiver and may be hardwired in the vehicle. Thus, when the camera is docked at the trailer docking station, the camera or trailer docking station wirelessly communicates to the data receiver at the vehicle docking station, which communicates (such as via a wired connection or vehicle communication bus or the like) to an electronic control unit (ECU) having a data processor and/or to a display device operable to display video images derived from or representative of the captured and communicated image data. For example, the image data signal may be communicated to an ECU, whereby the data may be processed by a data processor for object detection, and/or whereby the ECU may control the display device for displaying video images representative of the image data received at the ECU.

The camera may be a self-positioning/calibrating WIFI camera. The system may utilize an onboard sensor (such as an accelerometer) combined with image processing (such as via an image processor utilizing an image processing algorithm) to determine the orientation of the camera and to self-adjust the position of the camera, or to provide indication to customer which way to adjust manually (or to adjust processing of image data captured by the camera to accommodate determined misalignment). The vehicle and trailer docking stations may be mounted at respective particular positions at the vehicle/trailer so that a known portion of the vehicle or trailer is in the field of view of the camera (when docked at that docking station). Image data captured by the camera (when docked at that docking station with the known portion of the vehicle/trailer in the field of view of the camera) is processed to determine the orientation of the camera (by determining the location of the known portion of the vehicle/trailer in the field of view of the camera) and processing of the captured image data may be adjusted to accommodate any offset or misalignment of the docked camera.

Optionally, the system may utilize infrared (IR) lighting synchronization with the imager shutter to ensure that the image area will be lit when the imager is exposed to light. Such a synchronization saves on power consumption of the light emitting diodes (LEDs), since they do not have to be continuously energized.

Optionally, the system may utilize the imager as an ambient light sensor and may variably control the output of IR emitting LEDs. A control algorithm may function (responsive to an output of the imager) to vary the amount of IR lighting needed to create ideal lighting conditions.

Optionally, the docking station may comprise a secure docking bracket that requires a special key to unlock. The camera thus may be secured in the docking station with, for example, a keyed screw or via other locking means. Thus, the camera may be moved from one external (and accessible) docking station to another external (and accessible) docking station and may be secured or locked at the particular docking station, such that a person without the appropriate key cannot access and remove the camera from the docking station. The camera may lock at the docking station via any suitable mechanical or electromechanical means. For example, the system may provide for unlocking of the camera via a user input in the vehicle or via locking/unlocking of the vehicle. For example, the camera may be locked in place when the vehicle doors are locked, or the vehicle may have a remote input or button that a user in the vehicle may actuate to unlock the camera/docking station.

Optionally, the power and video connections may be incorporated into the mounting bracket of the docking station and/or camera. A self-docking mechanism may make electrical connections when the wireless camera is slid into the docking station. For example, when a user mounts the camera at a docking station or dock (such as connecting or inserting the camera into a receiving or mounting structure of the docking station until it clicks or locks in place), the electrical connections between the camera and docking station are also made. Thus, all connections for operation of the camera are made by the user simply plugging the camera into the docking station.

Optionally, the docking station may comprise an adjustable rotational mount that can be locked into position so as to be able to survive automotive environmental conditions and meet vibration requirements.

Optionally, the camera may include an adjustable lens/lens holder/imager board module, which can be automatically or manually adjusted for aiming the camera's field of view with respect to a permanently mounted trailer bracket. The camera thus may be mounted at the trailer bracket or docking station and may be adjusted so that its field of view encompasses the desired or appropriate region exterior the trailer (such as rearward of the trailer). Optionally, an app for a smart phone may function so that the smart phone display provides a viewfinder for the camera when installing the camera, so the user can adjust the camera aim or field of view while installing the camera. The image data captured by the camera is transmitted to the smart phone and images derived from the image data are displayed on the smart phone display (or other portable display device, such as a laptop or tablet or the like). The communication between the phone and camera may be a wireless communication, such as via BLUETOOTH or WIFI communication protocol or the like. Such communication may use a reduced bandwidth, since the display for adjusting the camera may have less resolution because displayed details are not critical.

The camera system may provide self-correcting color with respect to infrared (IR) lighting. For example, a control algorithm may be used to improve video image quality based on IR light intake.

The wireless WIFI camera may be positioned at the rear of a long trailer with an antenna wire connected to an antenna positioned at the front of the trailer. Optionally, the WIFI camera may be positioned at the rear of a long trailer with multiple repeaters positioned at the trailer to guarantee signal transfer from the rear of the trailer to the top of the trailer, and then to the front of the trailer.

Optionally, a docking station for the repeater may be permanently located, with a removable repeater removably disposed thereat, so that a user can configure the trailer for maximum signal integrity. For example, multiple docking stations can be installed on the trailer and the repeater can be removably mounted at a desired or appropriate docking station. The repeater may be rechargeable via an electrical connector/USB connection, or may be charged via wireless recharging.

Optionally, an app for a smart phone may or a vehicle receiver may communicate with the WIFI camera. The phone or receiver displays important signal information based on the camera's current location. For example, the display or device may communicate the strength of the communication link between the vehicle receiver and the camera. Optionally, the display or device may communicate an approximated time left for power usage or status from the camera.

Optionally, a WIFI module may be positioned at the front of the trailer with long wires for connecting to the camera so as to be able to position the camera anywhere else on the trailer, including the back of the trailer. The camera may comprise a dockable camera with a separate mount, and/or multiple mounts can be installed either inside or outside of the trailer.

The vision system may utilize a touchless/sealed video connector for wiring from outside of the vehicle to the trailer.

The system may provide video signal over power connection, which requires filter and circuitry at the vehicle power source at the rear of the vehicle. The system includes power wires to the trailer and to the location of the docking station and/or camera, where the power is then separated from the signal within the camera.

Thus, the system of the present invention provides enhanced communication and/or transmission of signals between a wireless or WIFI camera disposed at a rear of a trailer being towed by a vehicle and a control or device or processor or display device disposed in the vehicle towing the trailer. The system provides a camera docking station at the vehicle and at the trailer, such that the camera may be removably disposed at either docking station depending on whether or not the vehicle is towing a trailer. The system provides for display of video images derived from image data captured by the camera when the camera is docked at the vehicle docking station (when the vehicle is not towing a trailer) and when the camera is docked at the trailer docking station (when the vehicle is towing the trailer). The video images may be displayed during a reversing maneuver of the vehicle (or of the vehicle and trailer) to assist the driver in backing up the vehicle (and trailer). Optionally, the image data captured by the camera (docked at the vehicle docking station or at the trailer docking station) may be provided to a data processor for processing for object detection, such as to detect an object or pedestrian rearward of the vehicle/trailer during a reversing maneuver of the vehicle/trailer.

The vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties.

Optionally, the display for displaying images captured by one or more of the imaging sensors for viewing by the driver of the vehicle while the driver is normally operating the vehicle, may, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties. Optionally, the vision system (utilizing the forward viewing camera and a rearward viewing camera and other cameras disposed at the vehicle with exterior fields of view) may be part of or may provide a display of a top-down view or bird's-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular vision system, the vehicular vision system comprising:

a vehicle camera docking station disposed at a vehicle equipped with the vehicular vision system;

a trailer camera docking station disposed at a rear of a trailer;

a camera operable to capture image data and to communicate captured image data, wherein the camera comprises a lens and circuitry, and wherein the circuitry of the camera includes an imager;

wherein the vehicle camera docking station is configured to partially receive the camera thereat when the camera is disposed at the vehicle camera docking station, and wherein the camera, when disposed at the vehicle camera docking station, has a field of view at least rearward of the vehicle;

wherein the vehicle camera docking station comprises electronic circuitry that is electrically connected to the circuitry of the camera when the camera is disposed at the vehicle camera docking station;

wherein, when the trailer is not hitched to the vehicle, the camera is disposed at the vehicle camera docking station so as to have its field of view at least rearward of the vehicle;

wherein, with the camera disposed at the vehicle camera docking station, image data captured by the camera is provided to the electronic circuitry of the vehicle camera docking station;

wherein the trailer camera docking station is configured to partially receive the camera thereat when the camera is disposed at the trailer camera docking station, and wherein the camera, when disposed at the trailer camera docking station, has a field of view at least rearward of the trailer;

wherein the trailer camera docking station comprises electronic circuitry that is electrically connected to the circuitry of the camera when the camera is disposed at the trailer camera docking station;

wherein, when the trailer is hitched to the vehicle, the camera is removed from the vehicle camera docking station and disposed at the trailer camera docking station so as to have its field of view at least rearward of the trailer;

wherein, with the camera disposed at the trailer camera docking station, image data captured by the camera is provided to the electronic circuitry of the trailer camera docking station;

a data receiving device disposed at the vehicle;

a display device disposed in the vehicle and operable to display video images derived from image data captured by the camera;

wherein, when the trailer is not hitched to the vehicle, and with the camera disposed at the vehicle camera docking station, and during a reversing maneuver of the vehicle, the camera captures image data, and wherein the captured image data is provided to the electronic circuitry of the vehicle camera docking station and the vehicle camera docking station communicates the captured image data to the data receiving device, and wherein the captured image data communicated by the vehicle camera docking station is received at the data receiving device disposed at the vehicle;

wherein, when the trailer is hitched to the vehicle, and with the camera disposed at the trailer camera docking station, and during a reversing maneuver of the vehicle and trailer, the camera captures image data, and wherein the captured image data is provided to the electronic circuitry of the trailer camera docking station and the trailer camera docking station communicates the captured image data to the data receiving device, and wherein the captured image data communicated by the trailer camera docking station is received at the data receiving device disposed at the vehicle; and wherein the display device displays video images derived from the captured image data that is received at the data receiving device.

2. The vehicular vision system of claim 1, wherein the trailer camera docking station comprises a transmitting antenna, and wherein the transmitting antenna of the trailer camera docking station receives image data captured by the camera when the camera is docked at the trailer camera docking station, and wherein, with the trailer hitched to the vehicle and with the camera docked at the trailer camera docking station, the transmitting antenna of the trailer camera docking station wirelessly communicates to the data receiving device the image data captured by the camera docked at the trailer camera docking station.

3. The vehicular vision system of claim 1, wherein the vehicle camera docking station comprises a transmitting antenna, and wherein the transmitting antenna of the vehicle camera docking station receives image data captured by the camera when the camera is docked at the vehicle camera docking station, and wherein, when the trailer is not hitched to the vehicle and with the camera docked at the vehicle camera docking station, the transmitting antenna of the vehicle camera docking station wirelessly communicates to the data receiving device the image data captured by the camera docked at the vehicle camera docking station.

4. The vehicular vision system of claim 1, wherein the captured image data is wirelessly communicated, and wherein the data receiving device disposed at the vehicle receives the wirelessly communicated captured image data.

5. The vehicular vision system of claim 1, wherein the camera comprises a battery, and wherein the battery of the camera is charged at least when the camera is disposed at the vehicle camera docking station.

6. The vehicular vision system of claim 1, wherein the camera comprises a battery, and wherein the battery of the camera is charged at least when the camera is disposed at the trailer camera docking station.

7. The vehicular vision system of claim 1, wherein the vehicle camera docking station comprises a light source, and wherein the light source is operated responsive to determination of low lighting conditions when the camera is docked at the vehicle camera docking station and is capturing image data.

8. The vehicular vision system of claim 1, wherein the trailer camera docking station comprises a light source, and wherein the light source is operated responsive to determination of low lighting conditions when the camera is docked at the trailer camera docking station and is capturing image data.

9. A method of using a dockable camera with a vehicular vision system, the method comprising:

providing a vehicle camera docking station at a vehicle equipped with the vehicular vision system wherein the vehicle camera docking station comprises electronic circuitry;

providing a trailer camera docking station at a rear of a trailer wherein the trailer camera docking station comprises electronic circuitry;

providing a data receiving device at the vehicle;

providing a camera operable to capture image data and to communicate captured image data, wherein the camera comprises a lens and circuitry, and wherein the circuitry of the camera includes an imager;

providing a display device in the vehicle that is operable to display video images derived from image data captured by the camera;

when the trailer is not hitched to the vehicle, docking the camera at the vehicle camera docking station so the camera has a field of view at least rearward of the vehicle, wherein the electronic circuitry of the vehicle camera docking station is electrically connected to the circuitry of the camera when the camera is docked at the vehicle camera docking station;

when the trailer is not hitched to the vehicle and with the camera docked at the vehicle camera docking station and during a driving maneuver of the vehicle, capturing image data via the camera docked at the vehicle camera docking station and communicating, via the electronic circuitry of the vehicle camera docking station, the captured image data to the data receiving device;

hitching the trailer to the vehicle;

removing the docking the camera from the vehicle camera docking station and docking the camera at the trailer camera docking station so the camera has a field of view at least rearward of the trailer, wherein the electronic circuitry of the trailer camera docking station is electrically connected to the circuitry of the camera when the camera is docked at the trailer camera docking station;

with the trailer hitched to the vehicle and with the camera docked at the trailer camera docking station and during a driving maneuver of the vehicle and trailer, capturing image data via the camera docked at the trailer camera docking station and communicating, via the electronic circuitry of the trailer camera docking station, the captured image data to the data receiving device;

receiving the communicated captured image data at the data receiving device disposed at the vehicle; and displaying at the display device video images derived from the image data captured by the camera and received at the data receiving device.

10. The method of claim 9, wherein, with the trailer hitched to the vehicle and during the driving maneuver of the vehicle and trailer, receiving the communicated captured image data comprises receiving image data captured by the camera docked at the trailer camera docking station and communicated by the trailer camera docking station, and displaying at the display device video images comprises displaying at the display device video images derived from the image data captured by the camera docked at the trailer camera docking station and received at the data receiving device.

11. The method of claim 9, wherein, with the trailer not hitched to the vehicle and during the driving maneuver of the vehicle, receiving the communicated captured image data comprises receiving image data captured by the camera docked at the vehicle camera docking station and communicated by the vehicle camera docking station, and displaying at the display device video images comprises displaying at the display device video images derived from the image data captured by the camera docked at the vehicle camera docking station and received at the data receiving device.

12. The method of claim 9, wherein the trailer camera docking station comprises a transmitting antenna, and wherein the transmitting antenna of the trailer camera docking station receives image data captured by the camera when the camera is docked at the trailer camera docking station, and wherein, with the trailer hitched to the vehicle and with the camera docked at the trailer camera docking station, the transmitting antenna of the trailer camera docking station wirelessly communicates to the data receiving device image data captured by the camera docked at the trailer camera docking station.

13. The method of claim 9, wherein the vehicle camera docking station comprises a transmitting antenna, and wherein the transmitting antenna of the vehicle camera docking station receives image data captured by the camera when the camera is docked at the vehicle camera docking station, and wherein, with the trailer not hitched to the vehicle and with the camera docked at the vehicle camera docking station, the transmitting antenna of the vehicle camera docking station wirelessly communicates to the data receiving device image data captured by the camera docked at the vehicle camera docking station.

14. The method of claim 9, wherein communicating the captured image data comprises wirelessly communicating the captured image data, and wherein the data receiving device disposed at the vehicle receives the wirelessly communicated captured image data.

15. The method of claim 9, wherein the camera comprises a battery, and wherein the method comprises charging the battery at least when the camera is disposed at the vehicle camera docking station.

16. The method of claim 9, wherein the camera comprises a battery, and wherein the method comprises charging the battery at least when the camera is disposed at the trailer camera docking station.

17. The method of claim 9, comprising processing via a data processor image data captured by the camera to determine misalignment of the camera when the camera is docked at the vehicle camera docking station or the trailer camera docking station, and further comprising adjusting processing via the data processor of the image data captured by the camera to accommodate determined misalignment of the camera.

18. A vehicular vision system, the vehicular vision system comprising:

a vehicle camera docking station disposed at a vehicle equipped with the vehicular vision system;

a trailer camera docking station disposed at a rear of a trailer;

a camera operable to capture image data and to communicate captured image data, wherein the camera comprises a lens and circuitry, and wherein the circuitry of the camera includes an imager;

wherein the vehicle camera docking station is configured to partially receive the camera thereat when the camera is disposed at the vehicle camera docking station, and wherein the camera, when disposed at the vehicle camera docking station, has a field of view at least rearward of the vehicle;

wherein the vehicle camera docking station comprises electronic circuitry that is electrically connected to the circuitry of the camera when the camera is disposed at the vehicle camera docking station;

wherein, when the trailer is not hitched to the vehicle, the camera is disposed at the vehicle camera docking station so as to have its field of view at least rearward of the vehicle;

wherein, with the camera disposed at the vehicle camera docking station, image data captured by the camera is provided to the electronic circuitry of the vehicle camera docking station;

wherein the trailer camera docking station is configured to partially receive the camera thereat when the camera is disposed at the trailer camera docking station, and wherein the camera, when disposed at the trailer camera docking station, has a field of view at least rearward of the trailer;

wherein the trailer camera docking station comprises electronic circuitry that is electrically connected to the circuitry of the camera when the camera is disposed at the trailer camera docking station;

wherein, when the trailer is hitched to the vehicle, the camera is removed from the vehicle camera docking station and disposed at the trailer camera docking station so as to have its field of view at least rearward of the trailer;

wherein, with the camera disposed at the trailer camera docking station, image data captured by the camera is provided to the electronic circuitry of the trailer camera docking station;

wherein the vehicle camera docking station comprises a data receiving device;

a display device disposed in the vehicle and operable to display video images derived from image data captured by the camera;

wherein the trailer camera docking station comprises a transmitting antenna, and wherein, with the trailer hitched to the vehicle and with the camera docked at the trailer camera docking station and during a driving maneuver of the vehicle and trailer, the transmitting antenna of the trailer camera docking station wirelessly communicates to the data receiving device the image data captured by the camera;

wherein, with the trailer hitched to the vehicle and with the camera docked at the trailer camera docking station and during the driving maneuver of the vehicle and trailer, the data receiving device receives the wirelessly communicated image data captured by the camera;

wherein, with the trailer not hitched to the vehicle and with the camera docked at the vehicle camera docking station and during a driving maneuver of the vehicle, the data receiving device of the vehicle camera docking station receives image data captured by the camera; and wherein the display device displays video images derived from the captured image data received by the data receiving device.

19. The vehicular vision system of claim 18, wherein the camera comprises a battery, and wherein the battery of the camera is charged at least when the camera is disposed at the vehicle camera docking station.

20. The vehicular vision system of claim 18, wherein the camera comprises a battery, and wherein the battery of the camera is charged at least when the camera is disposed at the trailer camera docking station.

21. The vehicular vision system of claim 18, wherein the captured image data is communicated from the data receiving device of the vehicle camera docking station to the display device via a communication bus of the vehicle.

22. The vehicular vision system of claim 21, wherein the captured image data is communicated to a control unit of the vehicle, and wherein the control unit comprises a data processor that processes the communicated captured image data for object detection.

* * * * *